US009327688B2

(12) United States Patent
Boland

(10) Patent No.: US 9,327,688 B2
(45) Date of Patent: May 3, 2016

(54) WINDSCREEN WIPER DEVICE

(75) Inventor: Xavier Boland, Arlon (BE)

(73) Assignee: Federal-Mogul S.A., Aubange (BE)

( * ) Notice: Subject to any disclaimer, the term of this patent is extended or adjusted under 35 U.S.C. 154(b) by 723 days.

(21) Appl. No.: 13/699,100

(22) PCT Filed: May 20, 2010

(86) PCT No.: PCT/EP2010/056949
§ 371 (c)(1),
(2), (4) Date: Apr. 3, 2013

(87) PCT Pub. No.: WO2011/144241
PCT Pub. Date: Nov. 24, 2011

(65) Prior Publication Data
US 2013/0180072 A1 Jul. 18, 2013

(51) Int. Cl.
*B60S 1/38* (2006.01)
*B60S 1/40* (2006.01)

(52) U.S. Cl.
CPC ............ *B60S 1/4006* (2013.01); *B60S 1/3801* (2013.01); *B60S 1/4009* (2013.01); *B60S 2001/4032* (2013.01)

(58) Field of Classification Search
CPC ...... B60S 1/406; B60S 1/4009; B60S 1/4003; B60S 1/4077; B60S 1/387; B60S 1/3849; B60S 1/4006
USPC .............. 15/250.32, 250.43, 250.44, 250.361
See application file for complete search history.

(56) References Cited

U.S. PATENT DOCUMENTS

| 4,057,869 | A | * | 11/1977 | Longman | B60S 1/4003 15/250.32 |
| 4,370,775 | A | * | 2/1983 | van den Berg | B60S 1/4003 15/250.32 |
| 5,606,765 | A | * | 3/1997 | Ding | B60S 1/4019 15/250.32 |
| 5,819,362 | A | * | 10/1998 | Charng | B60S 1/3801 15/250.201 |
| 6,336,243 | B1 | * | 1/2002 | Charng | B60S 1/3806 15/250.201 |

(Continued)

FOREIGN PATENT DOCUMENTS

| CN | 201240358 Y | 5/2009 |
| EP | 1854685 A1 | 11/2007 |

(Continued)

*Primary Examiner* — Michael Jennings
(74) *Attorney, Agent, or Firm* — Robert L. Stearns; Dickinson Wright, PLLC

(57) ABSTRACT

A windscreen wiper device comprising a wiperblade having at least one yoke which is attached to a carrier and an oscillating arm pivotally connected to the carrier about a pivot axis near one end with the interposition of a connecting device, the oscillating arm comprising two longitudinal arm sections connected to each other by means of a curved intermediate arm section, wherein the connecting device comprises a resilient leg comprises at least one upwardly extending protrusion and at least one downwardly extending protrusion, wherein the upwardly extending protrusion is adapted to engage in a correspondingly shaped hole provided in an oscillating arm of a first type, and wherein the downwardly extending protrusion is adapted to engage in a correspondingly shaped hole provided in an oscillating arm of a second type, the oscillating arms of the first and the second types mutually differing in the distance between their respective longitudinal arm sections.

12 Claims, 7 Drawing Sheets

(56) References Cited

U.S. PATENT DOCUMENTS

| | | | |
|---|---|---|---|
| 7,207,082 B2 * | 4/2007 | Lee | B60S 1/4003 15/250.32 |
| 8,756,748 B2 * | 6/2014 | Erdal | B60S 1/3868 15/250.32 |
| 2005/0028312 A1 | 2/2005 | Coughlin | |
| 2008/0235896 A1 * | 10/2008 | Cheng | B60S 1/3881 15/250.201 |
| 2010/0205763 A1 * | 8/2010 | Ku | B60S 1/387 15/250.32 |
| 2011/0277264 A1 * | 11/2011 | Ehde | B60S 1/3863 15/250.32 |

FOREIGN PATENT DOCUMENTS

| | | |
|---|---|---|
| EP | 1911641 A2 | 4/2008 |
| WO | WO-2009/016569 A2 | 2/2009 |

* cited by examiner

WINDSCREEN WIPER DEVICE

BACKGROUND OF THE INVENTION

1. Technical Field

The present invention relates to a windscreen wiper device comprising a wiper blade having at least one yoke which is attached to a carrier in such a manner as to be capable of a pivoting movement about a first pivot axis, wherein both the carrier and the yoke have a substantially U-shaped cross-section at the location of their interconnection, wherein the windscreen wiper device further comprises an oscillating aim pivotally connected to the carrier about a second pivot axis near one end, wherein the carrier is provided, at the location of the second pivot axis, with a transverse shaft.

2. Related Art

A windscreen wiper device of this type is generally known and is usually provided with a plurality of yokes, in order to ensure that a wiper blade thereof is in contact with a, usually curved, windscreen along its entire length. Each yoke is thereby pivoted to the end of a carrier in its central portion, which carrier itself may also be a yoke. Usually the carrier and yoke(s) are made of metal, so that a plastic part often called "spacer" is interposed at the location of the connection of a carrier and a yoke, the plastic part being stationary with respect to a carrier associated therewith. The oscillating arm has a hook-shaped end hooking up the shaft of the carrier.

A disadvantage of such a known windscreen wiper device is that, due to high forces exerted in practice on the connection between the oscillating aim and the carrier, the reliability of the connection appears to diminish with the passage of time, resulting in play between the oscillating arm and the carrier. Such a play in practice has proven to lead to frictional contact between these parts and therefore leads to wear.

SUMMARY OF THE INVENTION

The object of the invention is to overcome these drawbacks of the prior art as indicated above, in particular to provide a windscreen wiper device wherein the carrier and the oscillating arm are interconnected in a simple though durable and solid manner.

In order to accomplish that objective a windscreen wiper device of the type referred to in the introduction is characterized according to the invention in that the oscillating arm and the carrier are interconnected with the interposition of a connecting device, the oscillating arm comprising two longitudinal aim sections connected to each other by means of a curved intermediate arm section, wherein the connecting device comprises a resilient leg comprises at least one upwardly extending protrusion and at least one downwardly extending protrusion, wherein the upwardly extending protrusion is adapted to engage in a correspondingly shaped hole provided in an oscillating arm of a first type, and wherein the downwardly extending protrusion is adapted to engage in a correspondingly shaped hole provided in an oscillating arm of a second type, the oscillating arms of the first and the second types mutually differing in the distance between their respective longitudinal arm sections. This makes it possible to realize an effectively operating and reliable joint being extremely wear resistant, whilst minimizing the number of parts.

Hence, the connecting device is a universal connection part for different types of hook-shaped oscillating arms, that is oscillating arms mutually differing in the distance between their respective longitudinal arm sections and thus in the "width" of their respective intermediate curved section. Only one type of the connecting device may be used for each different type of hook-shaped oscillating arm. The advantage achieved by the invention is that a unit consisting of the wiper blade and the connecting device can be manufactured for each and every type of hook-shaped oscillating arm.

Thus, a universal connection between the wiper blade and the oscillating arm is obtained, so that car drivers are given the possibility to buy also non-original cheap wiper blades fitting the original oscillating arms on their cars.

In a preferred embodiment of a windscreen wiper device in accordance with the invention the resilient leg is rotatable along a hinge axis between a first position, wherein the upwardly extending protrusion is adapted to engage in the correspondingly shaped hole provided in the oscillating arm of the first type for retaining the wiper blade onto the oscillating arm of the first type, and wherein the downwardly extending protrusion is adapted to engage in the correspondingly shaped hole provided in the oscillating arm of the second type for retaining the wiper blade onto the oscillating arm of the second type, and a second position, wherein the upwardly extending protrusion is adapted to disengage from the correspondingly shaped hole provided in the oscillating arm of the first type for releasing the wiper blade from the oscillating arm of the first type, and wherein the downwardly extending protrusion is adapted to disengage from the correspondingly shaped hole provided in the oscillating arm of the second type for releasing the wiper blade from the oscillating arm of the second type.

In another preferred embodiment of a windscreen wiper device according to the invention the upwardly extending protrusion and the downwardly extending protrusion are provided with an inclined upper surface. Sliding a longitudinal arm section of the oscillating arm of the first or the second type that faces towards the windscreen to be wiped, onto the connecting device will thus not take too much force.

In another preferred embodiment of a windscreen wiper device in accordance with the invention the correspondingly shaped hole is provided in a longitudinal arm section of the oscillating arm of the first and the second type that faces towards the windscreen to be wiped.

In another preferred embodiment of a windscreen wiper device according to the invention the connecting device has an at least substantially U-shaped cross-section having two resilient legs, and wherein one of the legs that faces towards the windscreen to be wiped comprises the at least one upwardly extending protrusion and the at least one downwardly extending protrusion.

In another preferred embodiment of a windscreen wiper device in accordance with the invention the resilient legs are interconnected near their free ends by a link to limit a movement in a direction away from each other.

In another preferred embodiment of a windscreen wiper device according to the invention the link is formed by a strap.

In another preferred embodiment of a windscreen wiper device in accordance with the invention one of the legs that faces away from the windscreen to be wiped comprises a transverse through hole for receiving a transverse pivot pin provided on an oscillating arm of a third type near a third pivot axis, wherein the oscillating arm of the third type is pivotally connected to the carrier about the third pivot axis near one end. Hence, the connecting device is a universal connection part not only for different types of hook-shaped oscillating arms (that is oscillating arms mutually differing in the distance between their respective longitudinal arm sections and thus in the "width" of their respective intermediate curved section), but also for an oscillating arm having a transverse pivot pin near one end thereof (i.e. a so-called "side connection" between the connecting device and the oscillating arm).

In another preferred embodiment of a windscreen wiper device according to the invention the carrier comprises two longitudinal side walls at the location of the connection to the connecting device, wherein the connecting device is detachably and pivotally connected to the carrier through a snapping/clipping connection, and wherein the shaft extending between the side walls of the carrier is pivotally engaged into a correspondingly shaped recess in the connecting device. It is noted that the transverse shaft is particularly formed by two protrusions each extending inwardly on a longitudinal side wall of the carrier.

Preferably the protrusions are cylindrical and form two cylindrical bearing surfaces. The two protrusions that function as bearing surfaces are spaced far apart, an that the forces that are exerted on the bearing surfaces will be relatively low. In the alternative, the shaft is formed by a pin extending from one longitudinal side wall to another longitudinal side wall of the carrier.

In another preferred embodiment of a windscreen wiper device in accordance with the invention the connecting device has an at least substantially U-shaped cross-section having two resilient legs, and wherein one of the legs that faces away from the windscreen to be wiped comprises a shoulder extending laterally outwardly from the leg and cooperating with a stop surface on the carrier to limit a movement of the connecting device relative to the carrier.

THE DRAWINGS

The invention will now be explained in more detail with reference to figures illustrated in a drawing, wherein.

DETAILED DESCRIPTION

Figure 1:
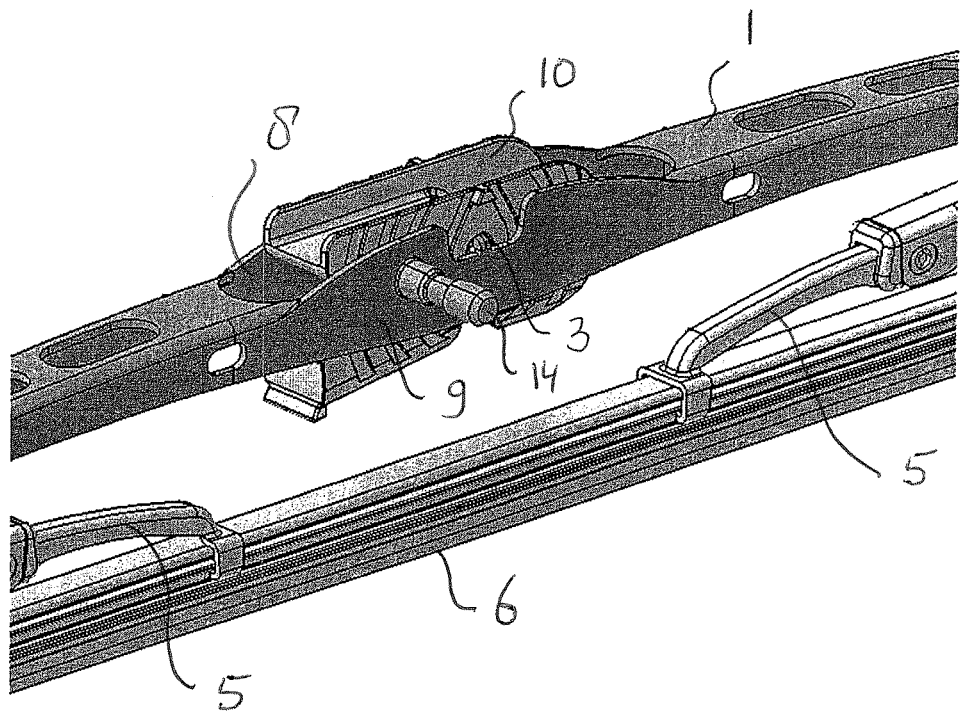
FIG. 1 is a perspective, schematic view of a preferred embodiment of a windscreen wiper device in accordance with the invention.
Figure 1:
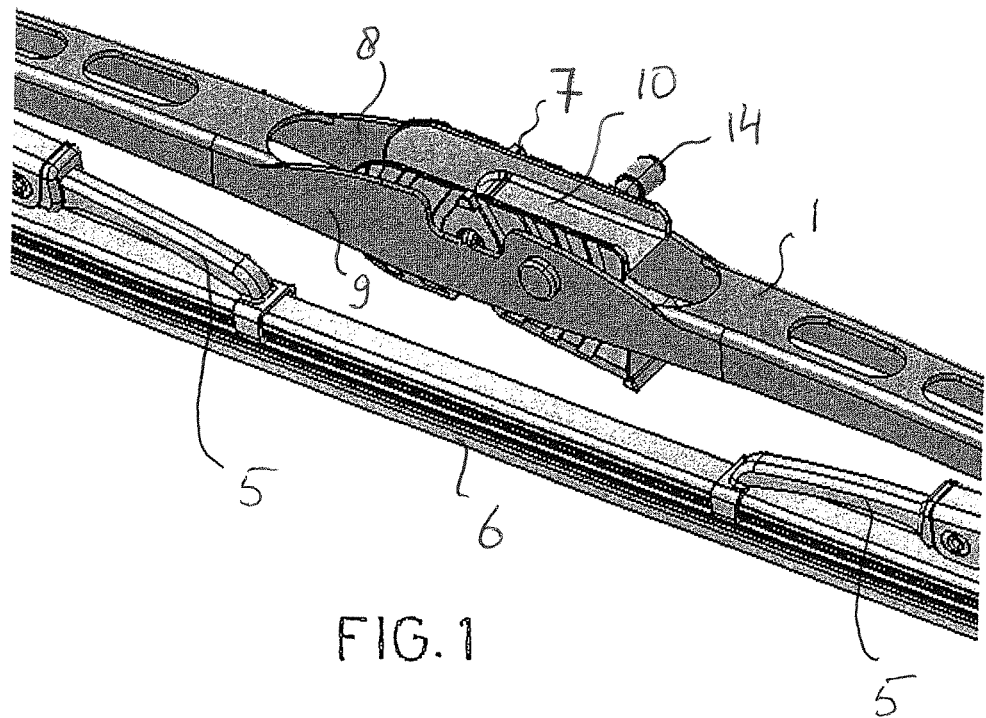

FIG. 1 shows a perspective view of a windscreen wiper device equipped with a first yoke 1 which can be pivotally attached to an oscillating arm 2 (see FIGS. 2 through 5) at the location of a pivot axis 3. The first yoke 1 functions as a carrier of two secondary yokes 4, which secondary yokes 4 function as carriers of four tertiary yokes 5. All yokes are pivot-mounted in their respective carriers, so that a force exerted at the location of the pivot axis 3 is distributed more or less evenly over the ends of the tertiary yokes 5, capable of being transferred to a rubber wiping element 6, which can be fitted on the ends of the tertiary yokes 5.

As can be seen from FIG. 1, the first yoke 1 is provided, at the location of the pivot axis 3, with a shaft in the form of a transverse pin 7 extending from one longitudinal side 8 to another longitudinal side 9 of the first yoke 1. A connecting device 10 is snapped ("clipped") onto the pin 7, in such a manner that the pin 7 is pivotally mounted in a correspondingly shaped recess 11 in the connecting device 10 (FIGS. 2, 3, 4 and 5). Longitudinal side walls 12,13 of the connecting device 10 abut the longitudinal sides 8,9 of the first yoke 1.

Figure 6:
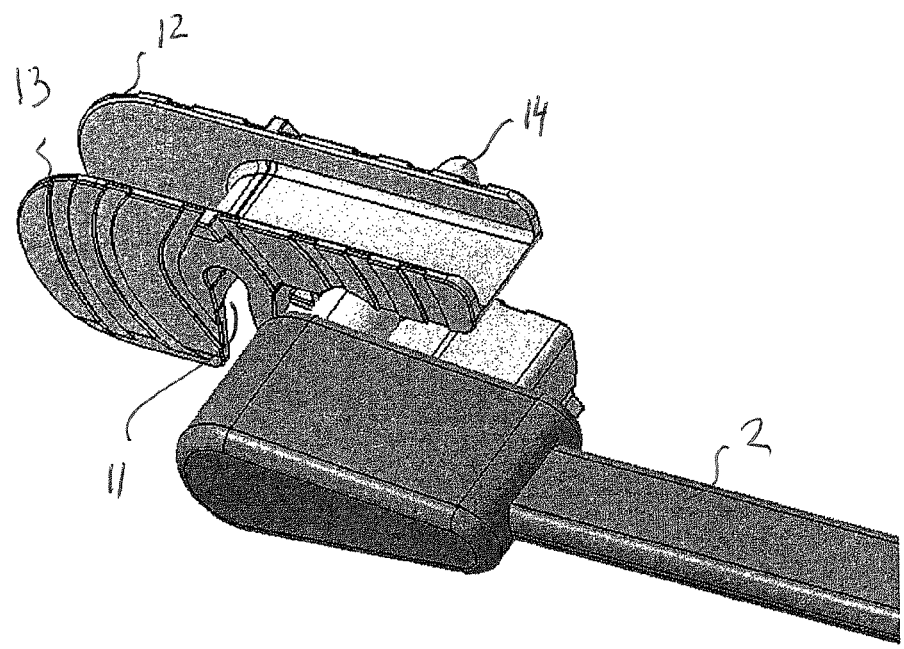
FIG. 6 is a top view and a side view of the interconnection between a connecting device and an oscillating arm with a transverse pin to be used windscreen wiper device of FIG. 1.
Figure 6:
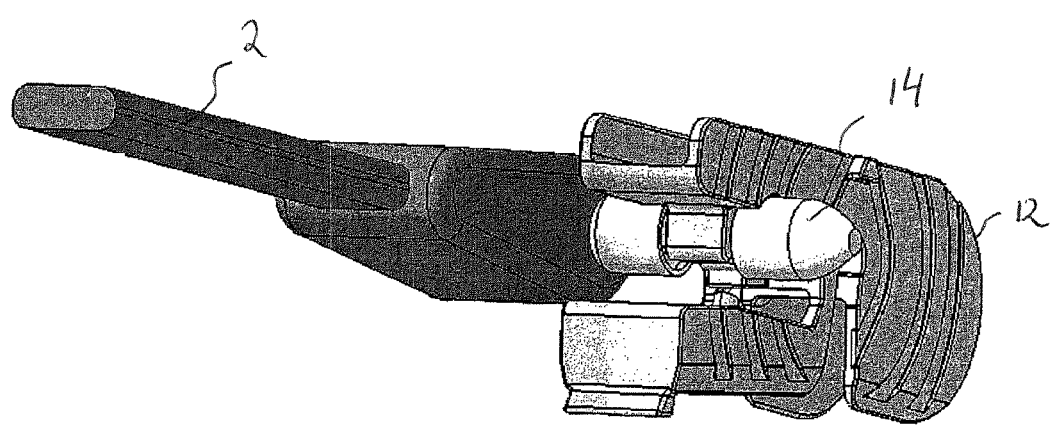
Figure 7:
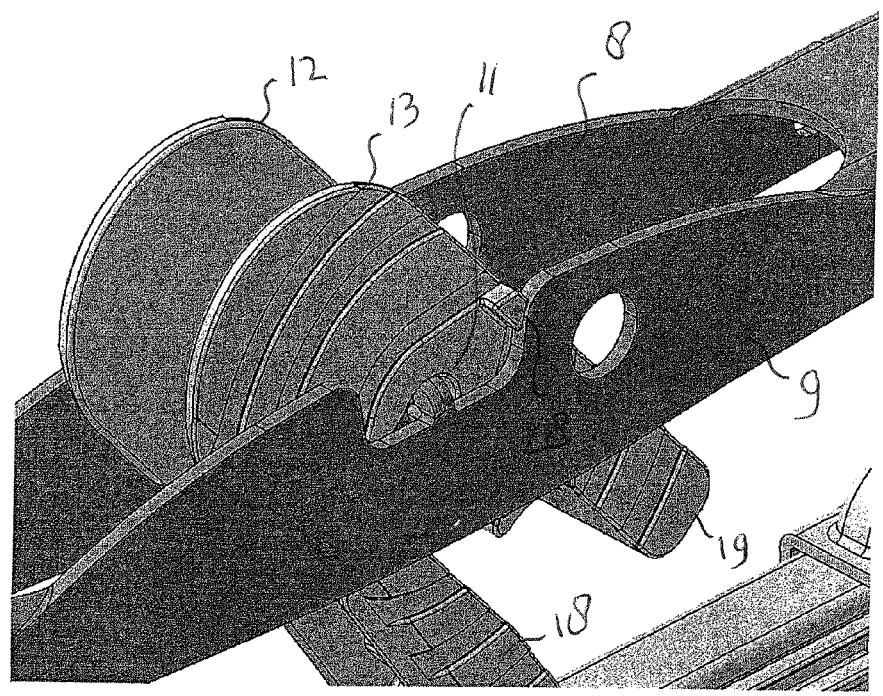
FIG. 7 shows several perspective, schematic views of a connecting device used in a windscreen wiper device of FIG. 1.
Figure 7:
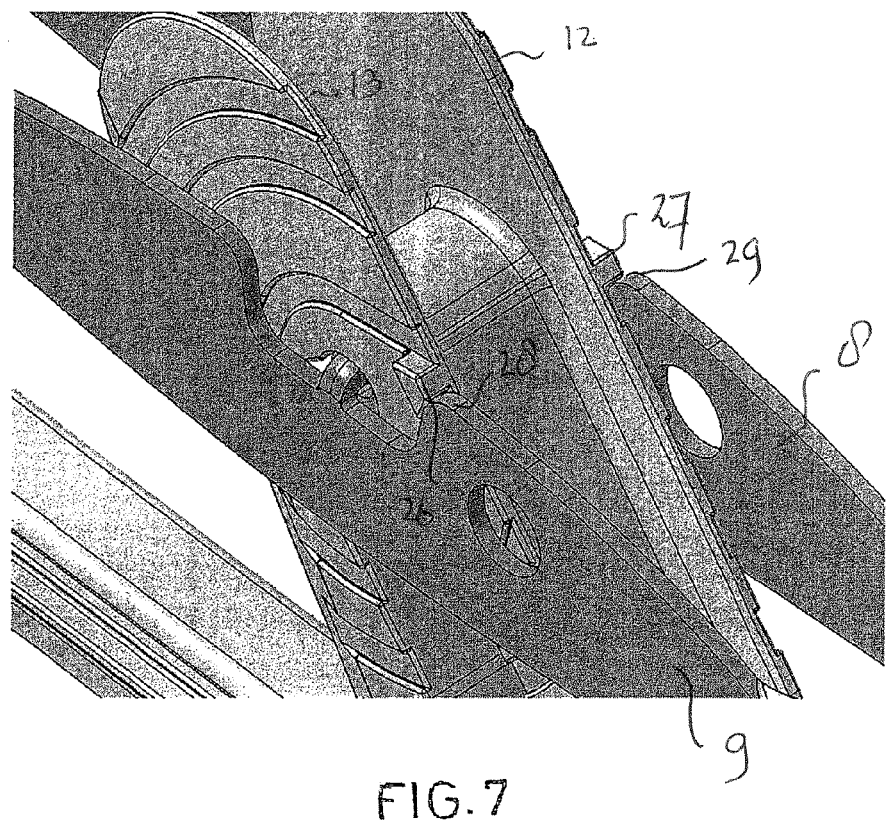

The connecting device 10 is a universal part in the sense that it can be used for each and every type of oscillating arm 2, that is, for example, for the oscillating arms 2 being hook-shaped, as shown in FIGS. 2, 3, 4 and 5, and for the oscillating arm 2 having a transverse pin 14, as shown in FIG. 6. As can be seen from FIGS. 2 through 5, the oscillating arm 2 includes two parallel longitudinal arm sections 15,16 connected to each other by means of a curved intermediate section 17, wherein the sections 15,16,17 are in one piece. As can be seen from FIGS. 2 through 5, the oscillating arms of the first and the second types shown in FIGS. 2 through 4 on the one hand and shown in FIG. 5 on the other hand mutually differ in the distance between their respective parallel longitudinal arm sections 15,16. Also, as can be seen from FIGS. 2 through 4, the oscillating arms of the first and the second types shown in FIGS. 2 through 4 mutually differ in the length of their respective longitudinal arm sections 15,16.

Figure 2:
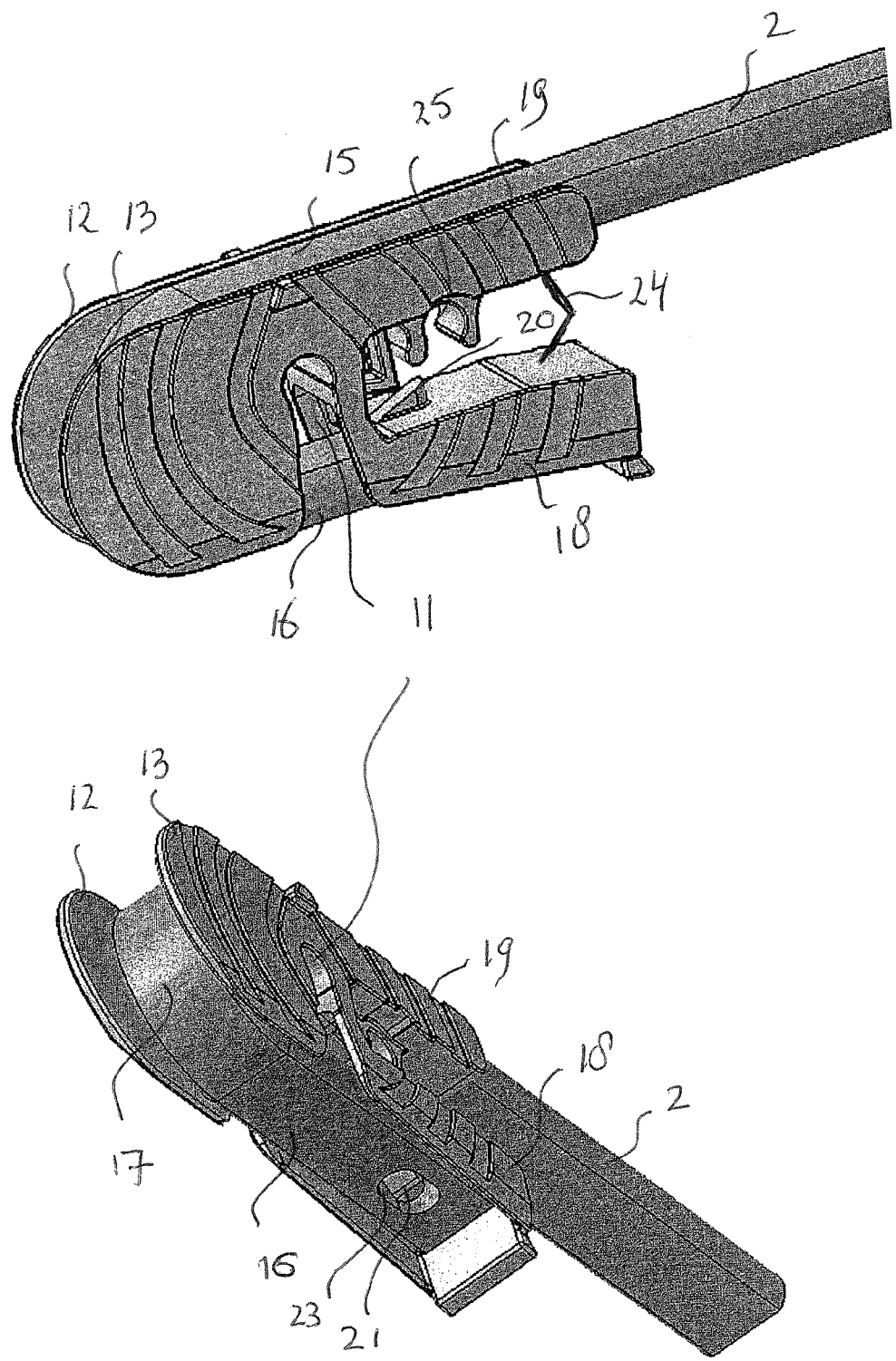
FIGS. 2, 3, 4 and 5 are a side view and a bottom view of the interconnection between a connecting device and a hook-shaped oscillating arm to be used in a windscreen wiper device of FIG. 1 for different types oscillating arms, respectively.
Figure 3:
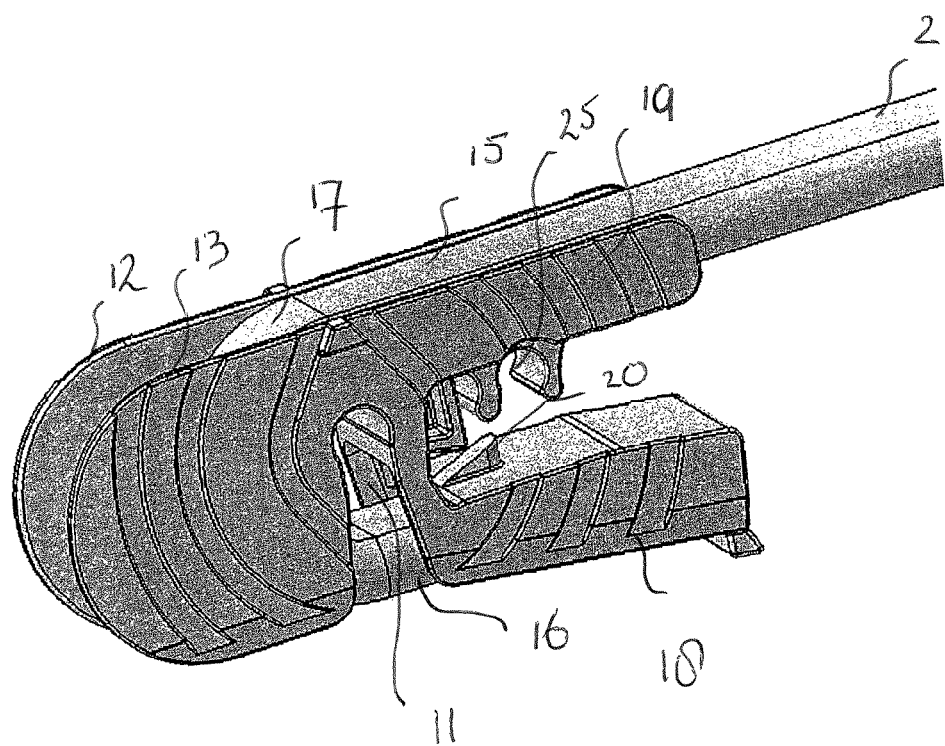
Figure 3:
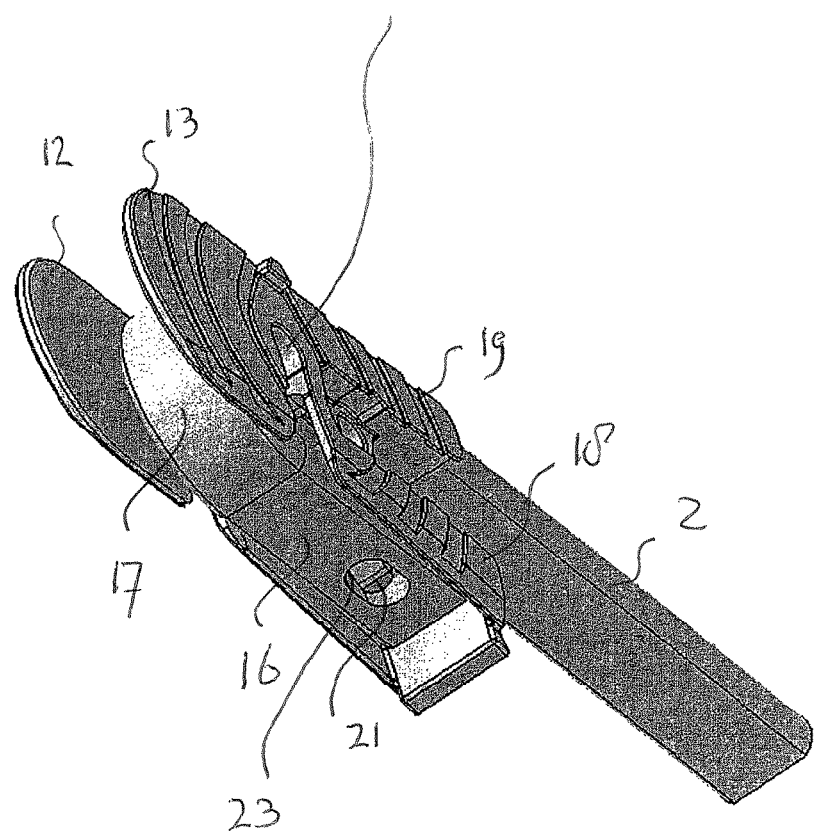
Figure 4:
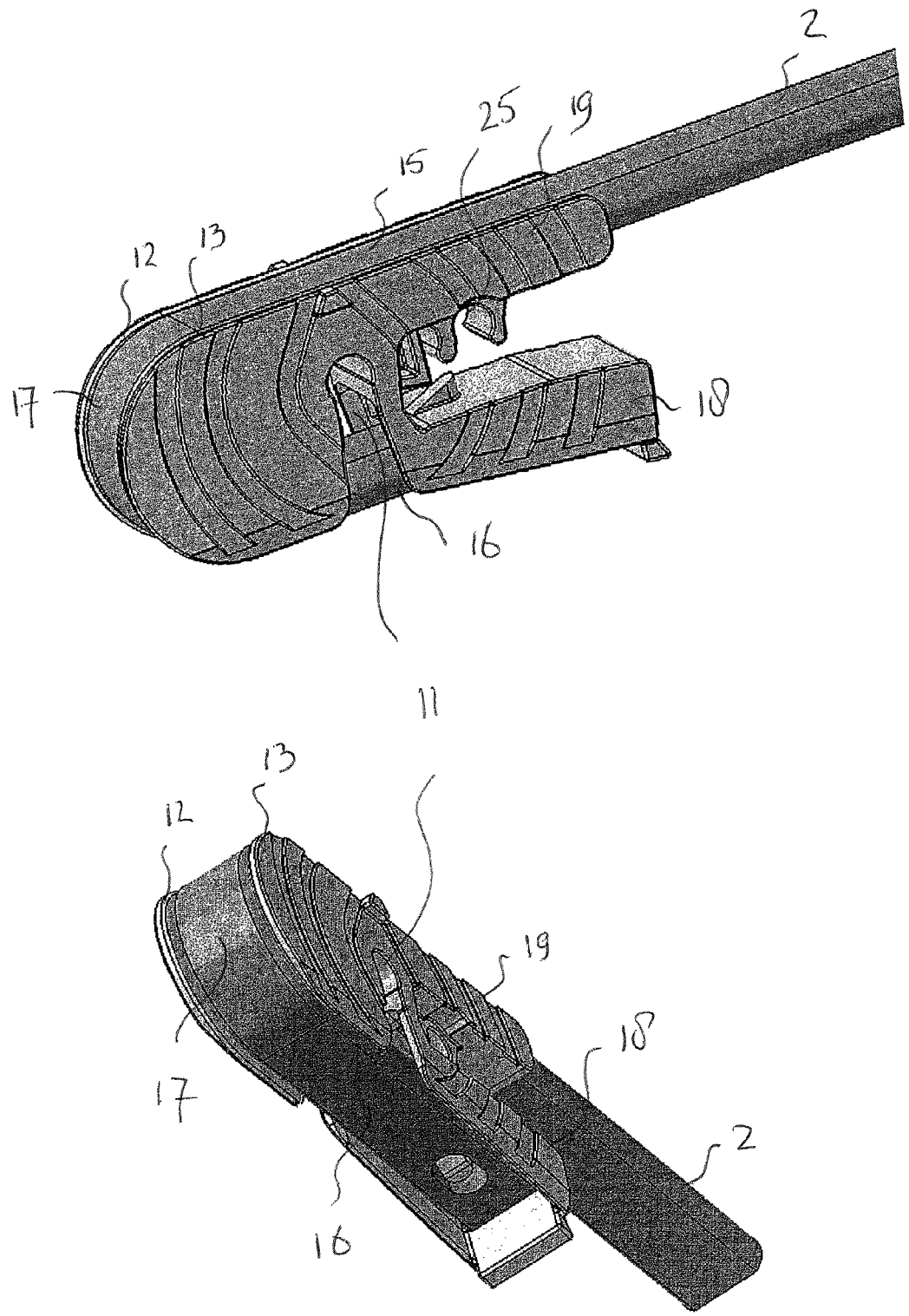
Figure 5:
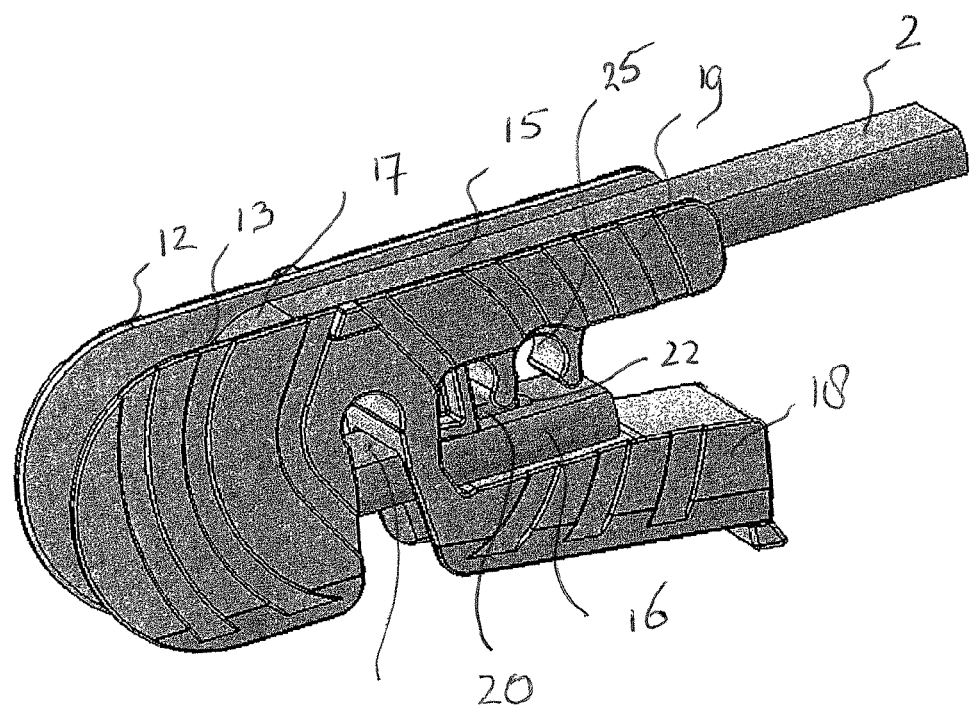
Figure 5:
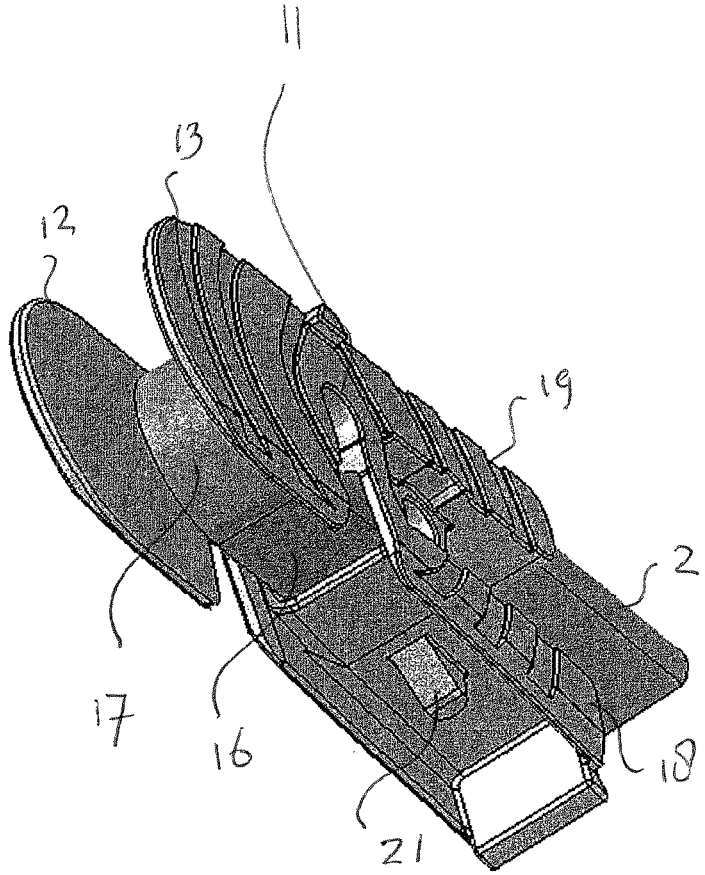

With reference to FIGS. 2 through 5, the connecting device 10 being basically of a U-shaped cross-section comprises two resilient legs 18,19, wherein the legs 18 facing towards a windscreen to be wiped comprises (in one piece therewith) an upwardly extending protrusion 20 and a downwardly extending protrusion 21. The upwardly extending protrusion 20 is adapted to snappingly engage in a correspondingly shaped hole 22 provided in an oscillating arm 2 of the type shown in FIG. 5, wherein the downwardly extending protrusion 21 is adapted to engage in a correspondingly shaped hole 23 provided in an oscillating arm 2 of the types shown in FIGS. 2 through 4. The resilient legs 18,19 may be interconnected near their free ends by a link in the form of a small, flexible strap 24 to limit a movement in a direction away from each other (FIG. 2).

As shown in FIGS. 2 through 6, one of the legs 19 that faces away from the windscreen to be wiped comprises a transverse through hole 25 for receiving the transverse pivot pin 14 provided on an oscillating arm 2 of another type (FIG. 6). The leg 19 further comprises two shoulders 26,27 extending laterally outwardly from the leg 19 on opposite sides thereof the shoulders 26,27 cooperate with respective stop surfaces 28,29 on the longitudinal sides 8,9 of the first yoke 1 to limit a movement of the connecting device 10 relative to the first yoke 1.

Although not depicted in the figures, it will be clear for a person skilled in the art that the oscillating wiper arm 8 is connected to a mounting head fixed for rotation to a shaft driven by a small motor. In use, the shaft rotates alternately in a clockwise and in a counter-clockwise sense carrying the mounting head into rotation also, which in turn draws the oscillating wiper arm 8 into rotation and by means of the connecting device 7 moves the wiper blade 2.

The present invention is not limited to the embodiment shown, but extends also to other embodiments falling within the scope of the appended claims.

The invention claimed is:

1. A windscreen wiper device comprising a wiper blade having at least one yoke which is attached to a carrier in such a manner as to be capable of a pivoting movement about a first pivot axis, wherein both said carrier and said yoke have a substantially U-shaped cross-section at the location of their interconnection, wherein said windscreen wiper device further comprises an oscillating arm of a first type or of a second type, said oscillating arm pivotally connected to said carrier about a second pivot axis near one end, wherein said carrier is provided, at the location of said second pivot axis, with a transverse shaft, wherein said oscillating arm and said carrier are interconnected with the interposition of a connecting device, said oscillating arm comprising two longitudinal arm sections connected to each other by means of a curved intermediate arm section, wherein said connecting device comprises a resilient leg comprises at least one upwardly extending protrusion and at least one downwardly extending protrusion, wherein said upwardly extending protrusion is adapted to engage in a correspondingly shaped hole provided in said oscillating arm of said first type, and wherein said downwardly extending protrusion is adapted to engage in a correspondingly shaped hole provided in said oscillating arm of said second type, wherein said connecting device has an at least substantially U-shaped cross-section having two resilient legs, wherein one of said legs has said at least one upwardly extending protrusion and said at least one downwardly extending protrusion, and wherein said resilient legs are interconnected near adjacent free ends by a link to limit movement in a direction away from each other, wherein said link is formed by a strap.

2. The windscreen wiper device according to claim 1, wherein said resilient leg is rotatable along a hinge axis between a first position, wherein said upwardly extending protrusion is adapted to engage in said correspondingly shaped hole provided in said oscillating arm of said first type for retaining said wiper blade onto said oscillating arm of said first type, and wherein said downwardly extending protrusion is adapted to engage in said correspondingly shaped hole provided in said oscillating arm of said second type for retaining said wiper blade onto said oscillating arm of said second type, and a second position, wherein said upwardly extending protrusion is adapted to disengage from said correspondingly shaped hole provided in said oscillating arm of said first type for releasing said wiper blade from said oscillating arm of said first type, and wherein said downwardly extending protrusion is adapted to disengage from said correspondingly shaped hole provided in said oscillating arm of said second type for releasing said wiper blade from said oscillating arm of said second type.

3. The windscreen wiper device according to claim 1, wherein said upwardly extending protrusion and said downwardly extending protrusion are provided with an inclined upper surface.

4. The windscreen wiper device according to claim 1, wherein said correspondingly shaped hole is provided in a longitudinal arm section of said oscillating arm of said first and said second type that faces towards said windscreen to be wiped.

5. The windscreen wiper device according to claim 1, wherein one of said legs that faces away from said windscreen to be wiped comprises a transverse through hole for receiving a transverse pivot pin provided on an oscillating arm of a third type near a third pivot axis, wherein said oscillating arm of the third type is pivotally connected to said carrier about said third pivot axis near one end.

6. The windscreen wiper device according to claim 1, wherein said carrier comprises two side walls at the location of the connection to the connecting device, wherein said connecting device is detachably and pivotally connected to said carrier through a snapping/clipping connection, and wherein said shaft extending between said side walls of said carrier is pivotally engaged into a correspondingly shaped recess in the connecting device.

7. The windscreen wiper device according to claim 1, wherein one of said legs that faces away from said windscreen to be wiped comprises a shoulder extending laterally outwardly from said leg and cooperating with a stop surface on the carrier to limit a movement of said connecting device relative to said carrier.

8. A windscreen wiper device comprising a wiper blade having at least one yoke which is attached to a carrier in such a manner as to be capable of a pivoting movement about a first pivot axis, wherein both said carrier and said yoke have a substantially U-shaped cross-section at the location of their interconnection, wherein said carrier is provided, at the location of a second pivot axis, with a transverse shaft, and including a connecting device connected to said transverse shaft and having a resilient leg with at least one upwardly extending protrusion and at least one downwardly extending protrusion, wherein said upwardly extending protrusion is adapted to engage in a correspondingly shaped hole provided in an oscillating arm of a first type, and wherein said downwardly extending protrusion is adapted to engage in a correspondingly shaped hole provided in an oscillating arm of a second type, wherein said resilient leg is rotatable along a hinge axis between a first position, wherein said upwardly extending protrusion is adapted to engage in the correspondingly shaped hole provided in the oscillating arm of the first type for retaining the wiper blade onto the oscillating arm of the first type, and wherein said downwardly extending protrusion is adapted to engage in the correspondingly shaped hole provided in the oscillating arm of the second type for retaining the wiper blade onto the oscillating arm of the second type, and a second position, wherein said upwardly extending protrusion is adapted to disengage from the correspondingly shaped hole provided in the oscillating arm of the first type for releasing said wiper blade from the oscillating arm of the first type, and wherein said downwardly extending protrusion is adapted to disengage from the correspondingly shaped hole provided in the oscillating arm of the second type for releasing said wiper blade from the oscillating arm of the second type, wherein said connecting device has an at least substantially U-shaped cross-section having two resilient legs, and wherein one of said legs comprises said at least one upwardly extending protrusion and said at least one downwardly extending protrusion, and wherein said resilient legs are interconnected near their free ends by a link to limit a movement in a direction away from each other, wherein said link is formed by a strap.

9. The windscreen wiper device according to claim 8, wherein said upwardly extending protrusion and said downwardly extending protrusion are provided with an inclined upper surface.

10. The windscreen wiper device according to claim 8, wherein one of said legs that faces away from said windscreen to be wiped comprises a transverse through hole for receiving a transverse pivot pin provided on an oscillating arm of a third type near a third pivot axis.

11. The windscreen wiper device according to claim 8, wherein said carrier comprises two side walls at the location of the connection to the connection device, wherein said connecting device is detachably and pivotally connected to said carrier through a snapping/clipping connection, and wherein said shaft extending between said side walls of said carrier is pivotally engaged into a correspondingly shaped recess in the connecting device.

12. The windscreen wiper device according to claim 8, wherein one of said legs that faces away from said windscreen to be wiped comprises a shoulder extending laterally outwardly from said leg and cooperating with a stop surface on the carrier to limit a movement of said connecting device relative to said carrier.

* * * * *